W. K. LAWSON.
Hose and Pipe Coupling.
No. 222,713.   Patented Dec. 16, 1879.
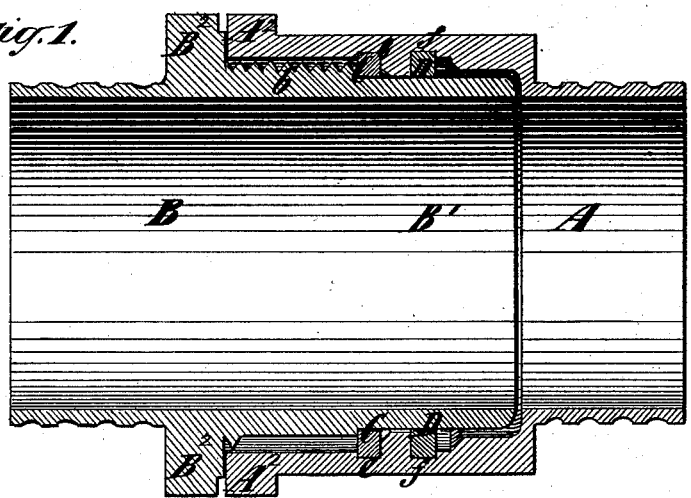
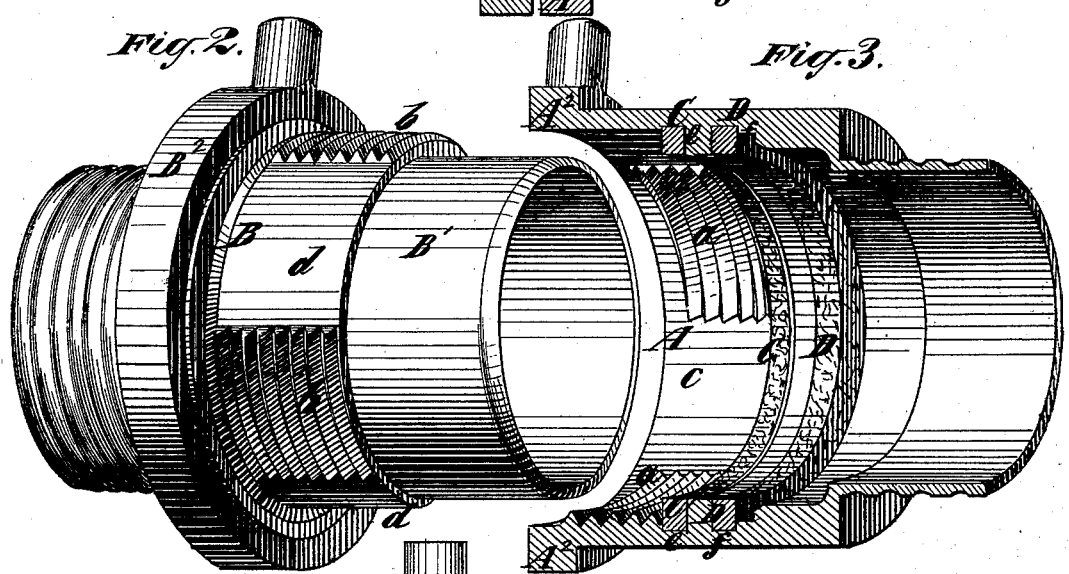
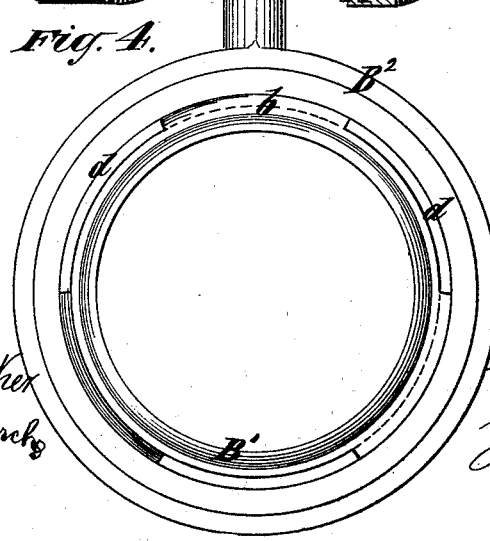

UNITED STATES PATENT OFFICE.

WILLIAM K. LAWSON, OF COLD SPRING, NEW YORK.

IMPROVEMENT IN HOSE AND PIPE COUPLINGS.

Specification forming part of Letters Patent No. 222,713, dated December 16, 1879; application filed September 19, 1879.

*To all whom it may concern:*

Be it known that I, WILLIAM K. LAWSON, of Cold Spring, in the county of Putnam and State of New York, have invented certain new and useful Improvements in Hose and Pipe Couplings, of which the following is a specification.

My improvements are especially intended for use in fire-hose couplings; and their object is to obtain a strong coupling the parts of which shall not be liable to leak.

To this end my invention consists in a coupling composed of two parts, one of which is provided with an internal or female mutilated screw-thread, and a recess or groove for the reception of a packing at the bottom of the screw-thread, and the other of which is provided with an external correspondingly mutilated male screw-thread, and with a tubular extension extending beyond said male screw-thread, made smaller in diameter than the bottom of said screw-thread, so as to form a shoulder, whereby, when the two parts are coupled, the said shoulder bears against the packing, while the tubular extension passes through and is embraced by the packing; and I may also provide below the said groove another groove or recess and packing-ring adapted to hug closely upon the tubular extension of said male part and prevent leakage.

In the accompanying drawings, Figure 1 represents a longitudinal section of a coupling embodying my invention. Fig. 2 is a perspective view of the male part thereof. Fig. 3 is a longitudinal section, in perspective, through the female part thereof; and Fig. 4 is an end view of said male part.

Similar letters of reference designate corresponding parts in all the figures.

A and B designate the two parts of which my coupling is composed, and which are each intended to be secured to the end of a piece of hose. The part A, or female part, is provided with an internal screw-thread, $a$, and the part B, or male part, is also provided with an external screw-thread, $b$, corresponding to the female screw-thread $a$.

In order to provide for coupling the parts quickly, the screw-threads $a$ and $b$ are mutilated, or have portions $c\, d$ removed, leaving segments or sectional threads in each part which correspond with the spaces or removed portions of the thread in the other part, and hence the two parts may be slipped together and then turned a portion of a revolution to bring the screw-threads into engagement. A coupling so constructed may be quickly and easily uncoupled, and will, when coupled, have all the strength of a perfect continuous screw-thread.

The part B is provided with a tubular extension, B′, extending beyond the screw-threaded portion, and which affords facility for inserting the said part in the female part A.

A washer or packing might, if desirable, be inserted between the meeting faces of the flanges $A^2\, B^2$; but as such a packing would be liable to become covered with dirt when the parts are uncoupled I prefer to place the packing within the female part.

C designates a packing-ring, of rubber, leather, or similar material, which is inserted in a groove or recess, $e$, at the bottom of the screw-thread $a$. The tubular extension B′ is less in diameter than the bottoms of the male screw-threads, so as to form a shoulder which, when the parts are coupled, bears upon the packing C, while the tubular extension extends through and is embraced by the said packing. Below the groove $e$ is another groove or recess, $f$, in which is inserted a packing, D, of a size to fit snugly around the tubular extension B′.

The groove $f$ is made wider than the packing, so as to allow the water to press the said packing tightly around the tubular extension B′ and prevent leakage.

By my invention I provide a coupling which is very strong and simple in construction, the parts of which may be readily coupled, and in which the packing is placed inside the female part, and is hence under cover and prevented from being covered with dirt when the parts are uncoupled.

What I claim as my invention, and desire to secure by Letters Patent, is—

1. A coupling composed of two parts, one of which is provided with an internal or female mutilated screw-thread, and with a recess or groove for the reception of a packing at the bottom of said screw-thread, and the other of which is provided with an external correspondingly mutilated male screw-thread, and with a tubular extension extending beyond said male screw-thread, made smaller in diameter than the bottom of said male screw-thread, so as to form a shoulder, whereby, when the two parts are coupled, the said shoulder rests against the packing, while the tubular extension extends through and is embraced by the packing, substantially as specified.

2. The combination, with the part A, provided with the internal mutilated screw-thread, $a$, and with the packings C D, of the part B, provided with the external mutilated screw-thread, $b$, and with the tubular extension B', which, when the two parts are coupled, passes through both said packings, substantially as specified.

WM. K. LAWSON.

Witnesses:
R. CARMICHAEL,
C. H. FERRIS.